United States Patent [19]

Yoshida

[11] Patent Number: 4,815,758
[45] Date of Patent: Mar. 28, 1989

[54] VEHICLE HEIGHT ADJUSTMENT DEVICE

[75] Inventor: Takao Yoshida, Koganei, Japan

[73] Assignee: Honda Giken Kogyo Kabushiki Kaisha, Tokyo, Japan

[21] Appl. No.: 98,659

[22] Filed: Sep. 21, 1987

[30] Foreign Application Priority Data

Sep. 19, 1986 [JP] Japan .................. 61-219115

[51] Int. Cl.$^4$ .......................................... B60G 17/00
[52] U.S. Cl. .................................... 280/840; 152/416
[58] Field of Search ............ 280/6 R, 714, DIG. 1; 152/416

[56] References Cited

U.S. PATENT DOCUMENTS

| | | | |
|---|---|---|---|
| 4,313,483 | 2/1982 | Brockmann | 152/416 |
| 4,390,187 | 6/1983 | Maeda | 280/6 R |
| 4,583,566 | 4/1986 | Krolavitz et al. | 152/416 |
| 4,641,843 | 2/1987 | Morrisroe, Jr. | 280/6 R |

Primary Examiner—David M. Mitchell
Assistant Examiner—Ross Werover
Attorney, Agent, or Firm—Pollock, Vande Sande & Priddy

[57] ABSTRACT

Device for adjusting the height of a vehicle by adjusting the amount of air contained in a cushion unit suspending the vehicle body. The device comprises an assembly of valves by which an air passage can be communicated selectively to a compressor, to an exhaust conduit, the cushion unit, a tire or atmosphere. A sensor is provided for sensing the pressure in the air passage, the valves are selectively actuated by switches, and a display panel shows the pressure level in the air passage.

1 Claim, 2 Drawing Sheets

VEHICLE HEIGHT ADJUSTMENT DEVICE

FIELD OF THE INVENTION

The present invention relates to a device for adjusting the height of a vehicle by adjusting the amount of air enclosed in a cushion unit constituting a suspension device for the vehicle body, and more particularly to a vehicle height adjusting device which makes it possible to check air injection into and air exhaust from a tire, as well as air pressure.

BACKGROUND OF THE INVENTION

Prior art automobiles and motorcycles have incorporated a device in which a closed air chamber is contained within a cushion unit (a shock absorber), and this air chamber is adapted to give a required spring constant when filled with high pressure air, the length of the cushion unit being changed by injecting or exhausting high pressure air to adjust vehicle height. In vehicles provided with such a device, exhaust air from a compressor carried on the vehicle is fed to the air chamber of the unit, for example through a solenoid valve, so as to expand the unit. To contract the unit, the high pressure air in the air chamber is exhausted to atmosphere through the other solenoid valve.

Japanese Utility Model Publication No. 19997/1976 discloses a mechanism by which a driver can obtain a desired vehicle height by air injection into or air exhaust from a suspension unit via a compressor for adjusting the vehicle height, the pressure applied to the suspension being measured by a pressure gauge. The reference does not disclose that air is evacuated through an air outtake port and that air pressure of a tire can be adjusted by utilizing a pressure gauge for adjusting vehicle height.

While the compressor in prior art devices may be used for supplying air to the tire, removal of air from the tire by direct bypass from the compressor requires a system separate from the vehicle height adjusting device. Accordingly, it cannot check the air pressure of the tire, and such air pressure must therefore be measured by means of a separate air gauge.

SUMMARY OF THE INVENTION

To eliminate this problem, the vehicle height adjustment device according to the present invention is provided with a valve assembly which has valves adapted to communicate with an air passage to the compressor and with an air outlet conduit capable of selectively connecting the air passage to the cushion unit, to atmosphere and to a tire, and which has a pressure sensor sensing the air pressure in the said air passage, switches adapted to selectively actuate each of the valves, and a display device connected to the pressure sensor and indicating the air pressure in the said air passage.

In order to increase the vehicle height utilizing the vehicle height adjusting device according to the invention, the compressor is operated and the valve communicating with the cushion unit is operated by actuating the corresponding switch. This causes exhaust air from the compressor to be fed to the cushion unit, whereby the latter expands and therefore the vehicle height increases. To decrease the vehicle height, the compressor is stopped and the valve communicating with atmosphere is opened by actuating the corresponding switch. This causes part of the high pressure air in the cushion unit to be exhausted to atmosphere, causing the cushion unit to contract and the vehicle height to decrease.

In order to inject air into the tire, the air exhaust conduit is connected to the tire and the compressor is operated. Thereafter, by opening the valve communicating with the air exhaust conduit in the same manner as mentioned above, air injection is performed. When operation of the compressor has stoped, if the valves communicating respectively with the air exhaust conduit and with atmosphere are opened, the air in the tire is exhausted to atmosphere, whereby the tire pressure is lowered.

When the valve communicating with the cushion unit is opened, since the pressure in the air passage is substantially equal to the pressure in the cushion unit, the latter pressure is displayed on the display device through the pressure sensor. When the valve communicating with the air exhaust conduit is opened, the pressure in the air passage is substantially equal to the pressure in the tire, and therefore the latter pressure is displayed on the display device through the pressure sensor.

Thus, according to the present invention, it is possible to perform both air injection into and air exhaust from the tire by utilizing the vehicle height adjustment device. It is also possible to confirm with ease, by means of the display device, not only the air pressure in the cushion unit, but also the air pressure in the tire.

BRIEF DESCRIPTION OF THE DRAWINGS

The invention will now be described with reference to the accompanying drawings, in which an embodiment of the invention is shown for purposes of illustration, and in which.

DESCRIPTION OF PREFERRED EMBODIMENT

Figure 1:
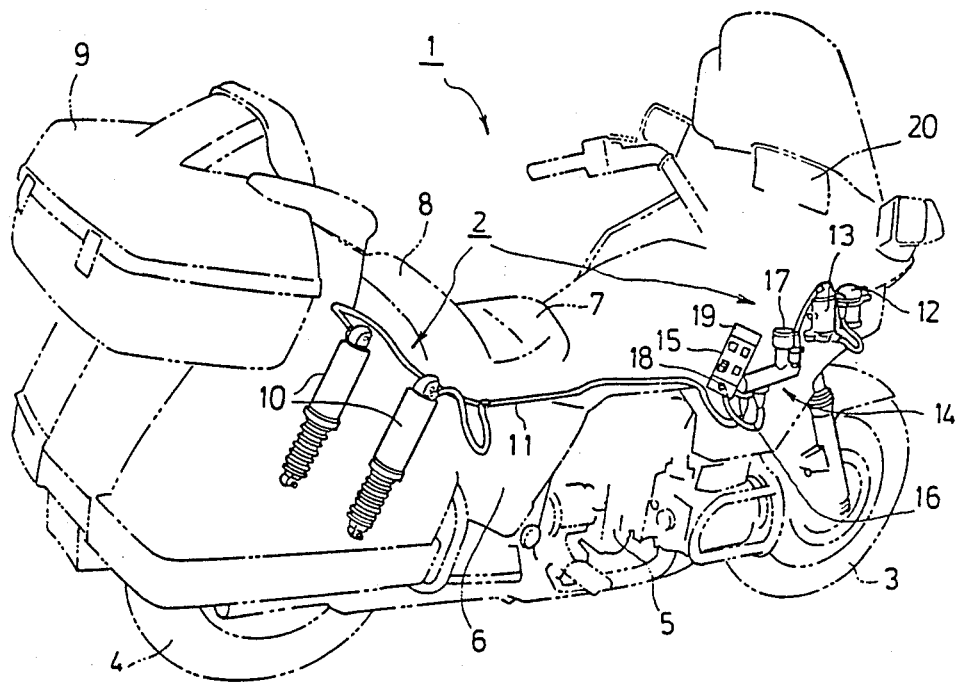
FIG. 1 is a perspective view showing a vehicle height adjustment device according to the present invention provided on a motorcycle.

As shown in FIG. 1, the motorcylce 1 carries an engine 5 between a front wheel 3 and a rear wheel 4, and the upper portion of the vehicle body is entirely covered by a fairing 6. The vehicle height adjustment device 2 is provided inside the fairing 6. The motorcycle is provided with a double seat consisting of a front seat 7 and a rear seat 8. To the rear of the double seat there is a trunk compartment 9. A cushion unit 10 is provided for suspending the rear wheel 4 on the vehicle body. However, the unit also has a vehicle height adjustment function which expands by feeding air through an air hose 11 to lift a rear portion of the vehicle body and which contracts by exhausting air through the air hose 11 to lower the rear portion of the vehicle body. It is thus possible to adjust the rear portion of the vehicle body which moves up and down according to a change of movable load of the rear seat 8 and the trunk 9 by expanding the cushion unit 10, and to maintain a substantially horizontal orientation of the vehicle body regardless of the load condition.

In order to feed high pressure air to the air hose 11, compressor 12 driven by a motor is disposed at the front of a side portion of the vehicle body. The exhaust air from the compressor 12 is fed to the air dryer 13 and, after drying there, is fed to a valve assembly 14 described in detail hereinafter. Air hose 11 is connected to the valve assembly 14 through the intermediary of a solenoid valve, and to an air exhaust conduit 16 through the intermediary of a further solenoid valve, and is provided with a pressure sensor 17 which senses the air pressure of the inside air passage.

Figure 3:
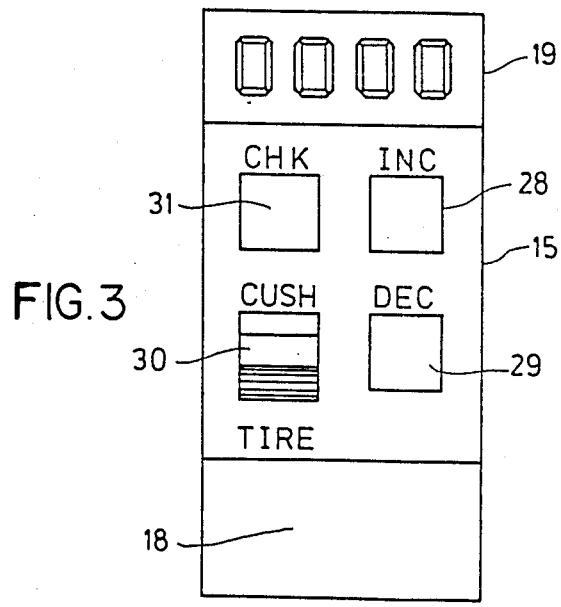
FIG. 3 is a front view of the control panel for the device.

On a rear upper portion of the valve assembly 14 there is a switch panel 15 exposed on the surface side of the fairing 6. On the switch panel 15 are disposed a motor of the compressor 12 and switches which actuate each of the solenoid valves as well as further solenoid valves described hereinafter (see FIG. 3). At a lower portion of the switch panel 15 is provided an air exhaust port 18 connecting an end portion of the air exhaust conduit 16. By connecting the air exhaust port 18 and the air gate port of the tire by means of a connecting hose, the exhaust air of the compressor 12 is adapted to be fed to the tire.

On an upper portion of the switch panel 15 there is a display panel 19, and, according to a signal from the pressure sensor 17, the pressure of the air passage in the valve assembly 14, and therefore the air pressure of the cushion unit or the tire, is adapted to be digitally displayed on the display panel 19. Alternatively, this display panel 19 may be arranged on a meter panel 20 provided in a center portion on the front surface of the vehicle body.

Figure 2:
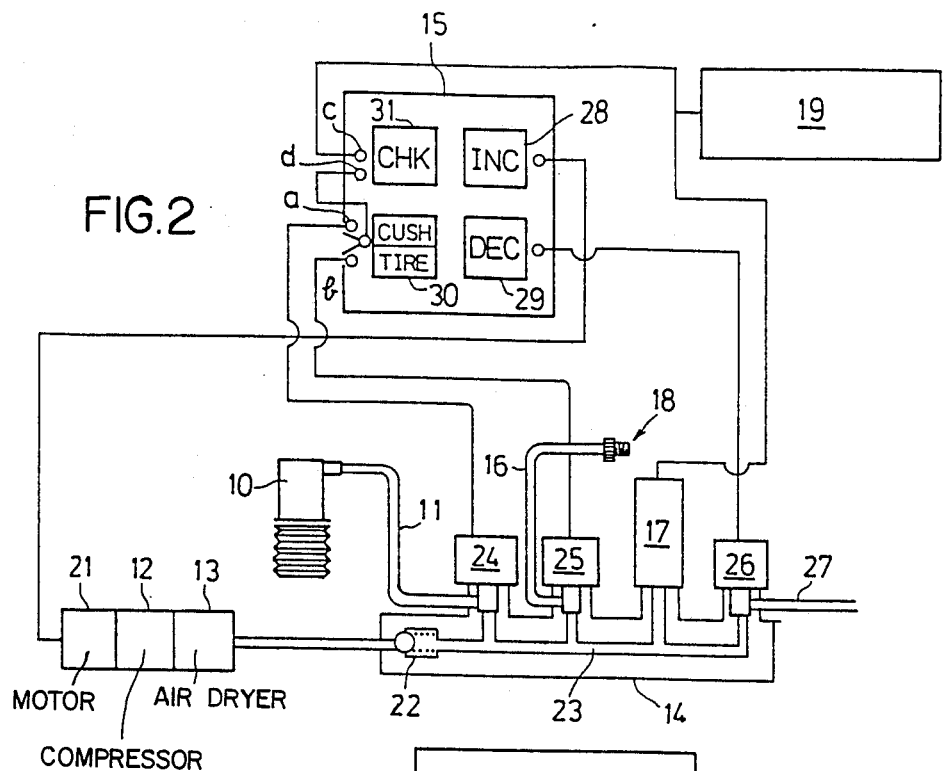
FIG. 2 is a schematic view of the device.

FIG. 2 is a schematic view showing the vehicle height adjustment device 2. The compressor 12 is driven by a motor 21 and exhaust air is fed to an air passage 23 in the valve assembly 14 via a check valve 22 after being dried by the air dryer 13. The air passage 23 communicates with the air hose 11 through the intermediary of a solenoid valve 24. That is, when the solenoid valve 24 is open, the air passage 23 communicates with the air hose 11, and when the solenoid valve 24 is closed, the air passage 23 and the air hose 11 are disconnected. The air passage 23 also communicates with the air exhaust conduit through the intermediary of a solenoid valve 25, and with a pipe 27 to atmosphere through the intermediary of a solenoid valve 26.

On the switch panel 15 are provided four switches, i.e., a pressure increase switch 28, a pressure decrease switch 29, a cushion-tire selection switch 30 and a check switch 31. The pressure increase switch 28 is connected with the motor 21. By pushing the switch, the motor 21 is actuated, whereby the compressor 12 is driven. The pressure decrease switch 29 is connected to the solenoid valve 26 which is actuated by pushing the switch, whereby the solenoid valve 26 is opened and the air passage 23 is communicated to the atmosphere through the outlet pipe 27. The cushion-tire selection switch 30 is a switch which can be connected selectively to either of two contacts "a", "b". When this switch is connected to the contact "a" side, the solenoid valve 24 is moved to open position, whereby the air passage 23 communicates with the air hose 11. When the cushion-tire selection switch 30 is connected to the contact "b" side, the solenoid valve 25 is moved to open position, whereby the air passage 23 communicates with the air exhaust conduit 16. When the check switch 31 is pushed, the contacts "c" and "d" close and the electric current is fed to display panel 19 to allow the latter to initiate a display thereon. The pressure in the air passage 23 is digitally indicated on the display panel according to the signal sent from the pressure sensor 17.

When a vehicle height adjustment is performed, the cushion-tire selection switch 30 is displaced to the contact "a" side. If the driver wishes to raise the vehicle height, the pressure increase switch 28 is turned on while the check switch 31 is pushed. The compressor 12 is then driven, causing the exhaust air to force the check valve 22 to open and to enter into the air passage 23. Since the exhaust air is fed to the cushion unit 10 via the solenoid valve 24 and the air hose 11, the unit expands. At this time, the display 19 indicates the air pressure of the cushion unit 10 communicating with the air passage 23.

If the driver wishes to lower the vehicle height, in a condition in which the pressure increase switch 28 is turned off and the compressor 12 is stopped, the pressure decrease switch 29 is turned on with pushing the check switch 31. At this time, the air of the cushion unit 10 is exhausted to atmosphere via the air hose 11, the solenoid valve 24, the air passage 23, the solenoid valve 26 and the atmosphere opening pipe 27. The air pressure is indicated on the display panel 19, as mentioned above.

When adjusting the tire pressure, the air exhaust port 18 and the air inlet and outlet port are connected by the connecting hose, and the cushion-tire selection switch 30 is displaced to the contact "b" side. If the driver wishes to increase the tire pressure, the pressure increase switch 28 is turned on by pushing the check switch 31. Then the compressor 12 is driven, and since the exhausted air is fed into the tire via the check valve 22, the air passage 23, the solenoid valve 25, the air exhaust conduit 16 and the connecting hose, the tire pressure increases. If the driver wishes to lower the tire pressure in the condition in which the pressure increase switch 28 is turned off and the compressor 12 stops, the pressure decrease switch 29 is turned on. At this time, the air of the tire is exhausted to atmosphere via the connecting hose, the air exhaust conduit 16, the solenoid valve 25, the air passage 23, the solenoid valve 26 and the atmosphere outlet pipe 27. When such an adjustment of the tire pressure is performed, since the pressure of the tire is indicated on the display panel 19, it is possible to adjust the tire pressure easily and precisely.

What is claimed is:

1. Device for selectively adjusting (1) the height of a vehicle by adjustment of the amount of air contained in a cushion unit supporting a body of said vehicle, and (2) pressure in a tire of said vehicle, said device comprising
    (a) a valve assembly comprising a plurality of valves adapted to selectively communicate a passage (23) carrying exhaust air from a compressor (12) on said vehicle with said cushion unit (10), with a tire of said vehicle, and with atmosphere, respectively;
    (b) switch means adapted to selectively actuate each of said valves, said switch means being arranged on a switch panel (15) and comprising
        (i) a pressure increase switch (28) causing actuation of a motor to drive said compressor, and a pressure decrease switch (29) causing said passage (23) to communicate with atmosphere;
        (ii) a selection switch (30) for communicating said air passage (23) selectively with said cushion unit and said tire; and
        (iii) a check switch (31) for feeding electric current to a display panel (19) which displays air pressure in said air passage; and
    (c) sensor means (17) in said air passage generating a signal indicating a pressure level in said passage, said pressure level being digitally displayed on said display panel.

* * * * *